May 13, 1958  R. J. BIBEAU  2,834,143
FISH LINE SINKER
Filed April 13, 1953
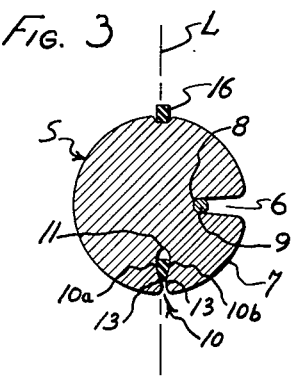
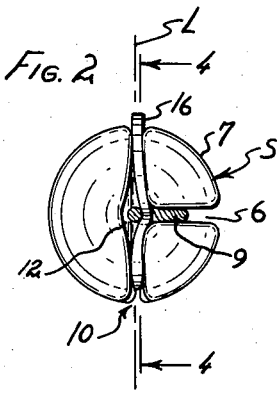
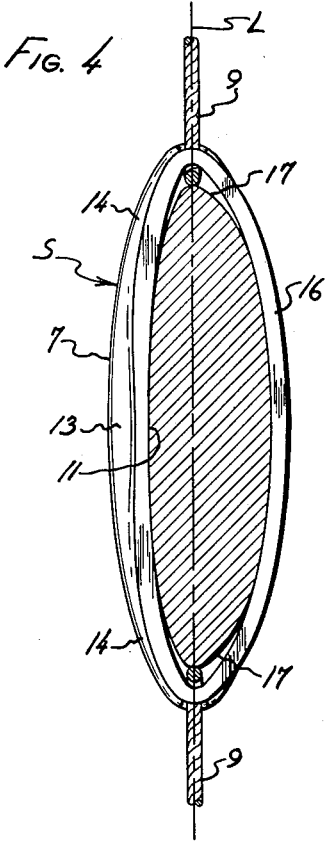
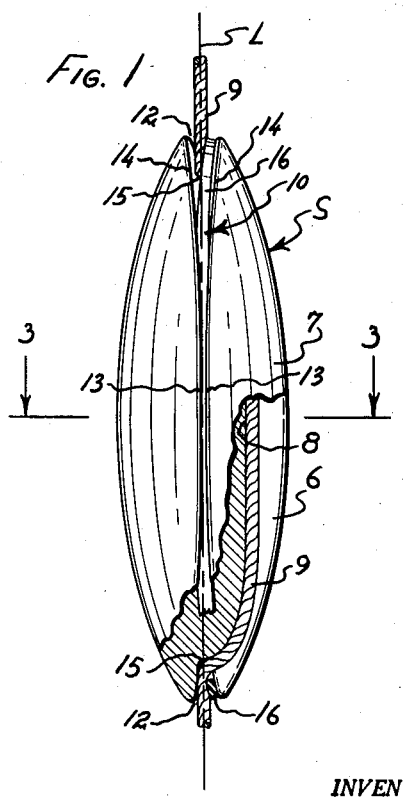
INVENTOR.
RUSSELL J. BIBEAU
BY Williamson, Williamson,
Schroeder & Adams
ATTORNEYS ём
United States Patent Office 2,834,143
Patented May 13, 1958

2,834,143

FISH LINE SINKER

Russell J. Bibeau, White Bear Lake, Minn.

Application April 13, 1953, Serial No. 348,542

1 Claim. (Cl. 43—44.95)

This invention relates to fish line sinkers and, more particularly, it relates to sinkers of the simplest type for attaching to and detaching from a fish line.

Fish line sinkers, in order to be manufactured at a minimum of cost, must be as simple as possible in construction and operation. At the same time, they must be so constructed as to avoid catching weeds and the like when in use. Many of the sinkers, although simple, are weed-catchers while others, although constructed to avoid catching weeds, are complex and too costly to manufacture. My invention is directed toward providing a sinker which will obviate these undesirable characteristics.

It is a general object of my invention to provide a novel and improved fish line sinker of cheap and simple construction.

A more specific object of my invention is to provide an efficient fish line sinker which can be manufactured at a high rate and with a minimum of cost.

Another object is to provide a fish line sinker which can be assembled with a minimum of time and effort.

Still another object is to provide a fish line sinker which can be readily attached to a line or removed therefrom.

Another object is to provide a fish line sinker which will function in an improved manner and yet can be manufactured at less cost than other satisfactory sinkers.

Yet another object is to provide a fish line sinker which may be manufactured in a single mold, the halves of which are identical.

Another object is to provide a novel and improved fish line sinker, the line-engaging means of which at all times exert positive tension on the fish line.

These and other objects and advantages of my invention will more fully appear from the following description made in connection with the accompanying drawings wherein like reference characters refer to the same parts throughout the several views and in which:

Fig. 1 is a side elevational view of one embodiment of my invention with a portion thereof broken away to show the manner in which the line-engaging means function;

Fig. 2 is an end elevational view of the same;

Fig. 3 is a cross sectional view taken approximately along line 3—3 of Fig. 1; and Fig. 4 is a longitudinal sectional view taken approximately along line 4—4 of Fig. 2.

One embodiment of my invention may include, as shown in Figs. 1–4, an elongated body indicated generally as S which comprises the sinker. This body S, as shown, is generally ellipsoidal in shape and is made of a material heavier than water, preferably of a relatively soft heavy material such as lead. This body S has a line-receiving slot 6 formed in its outer surface 7. The slot 6 extends longitudinally of the body S and throughout the length thereof and has a bottom portion 8 adapted to receive therein a fish line 9 which, when the sinker S is affixed thereto, extends longitudinally of the body S and the slot 6. The slot 6 is fairly deep as best shown in Fig. 3, but does not extend sufficiently far inward to reach the center of the body S with the result that the bottom 8 of the slot is positioned to one side of the longitudinal center line of the body S which has been indicated in Figs. 1, 3 and 4 by a broken line L. By referring to Fig. 3, it will be seen that the bottom 8 is positioned at the right of the center line in that view.

Also formed in the outer surface 7 of the body S is a groove indicated generally as 10. This groove 10 extends in a plane normal to the plane of the slot 6 as best shown in Fig. 3, and extends longitudinally of the body S and peripherally thereof as can best be seen in Figs. 1, 3 and 4. This groove 10 is deeper on one side as at 11 than on the other side of the body S and is slightly wider at the ends of the body S as at 12. The major portion of this groove 10 is disposed to one side of the longitudinal center line L as best shown in Fig. 3 wherein it is shown positioned mostly to the right of the center line. Thus it can be seen that the major portion at least of the groove 10 is positioned between the center line and the bottom 8 of the slot 6. In other words, the groove 10, as a whole, is slightly off-center of the longitudinal center line of the body S.

At the medial portions of the body S on the side thereof where the groove is deeper as at 11, the groove-defining portions of the body S which are the groove side walls 10a and 10b are more closely together so that the more outward portion of the groove is restricted as at 13 in Fig. 3. The end portions of the groove-defining material, on the side of the body S which has the restricted groove, are bevelled for purposes to be hereinafter described and, as shown at 14 in Fig. 1.

The bottom of the groove 10 at the ends of the body S forms a shelf, ledge or platform 15 which cooperates with a lathe-cut continuous rubber band 16 to provide line-engaging means for positively engaging the fish line 9 at each end of the sinker S. This elastic band 16, as is best shown in Fig. 1, does not register with the bottom of the groove 10 at the end portions because of the presence of the line 9 as best shown in Figs. 1 and 4. In other words, the elastic band 16 is prevented from moving inwardly and registering with the bottom of the groove 10 at the end portions of the sinker S. This can most clearly be seen as indicated by the numeral 17 in Fig. 4.

The body S is symmetrically formed, and can be molded in a single operation. The mold is simple and cheap to make and the sinker can be manufactured in large numbers at a very rapid rate. To assemble the sinker so that it is ready for application to a fish line, a plurality of bands such as the elastic bands 16 are stretched across a simple jig so that the cross diameter of each band is lessened substantially. Each sinker S is then presented to one of these bands with the bevelled portions 14 of the sinker S which define portions of the groove 10 foremost, and the body S is then slid along the band 16 so that the stretched band will slip into the groove 10 and inwardly of the restricted portions 13 of the groove. When the band has entered the groove 10 so as to lie within the groove inwardly of the restricted portions 13, the band is removed from the jig. Upon the removal of the band from the jig, it is, of course, released and this causes the diameter of the elastic band to increase so that the band will be retained within the groove 10 by the restricted portions 13 and extend outwardly therefrom in a free loop (not shown).

To apply the sinker to a fish line, the line is inserted into the slot 6 so as to extend longitudinally thereof and beyond the ends of the sinker. The free portion of the loop of the elastic band is then swung outwardly of the fish line and toward the slot 6 in the direction of the arrow as shown in Fig. 3, and around the body S until what was formerly the free loop portion of the band 16 comes to rest within the groove 10 as shown at the top of the body S in Fig. 3. The diameter of the elastic band 16 is such that when it is so positioned it is under considerable tension and, hence, exerts a positive tension on the line 9 and serves to retain itself within the groove 10.

Because of the tension of the band 16 and because the groove 10 at the end portions of the body S is of insufficient width to permit a line 9 of conventional diameter and a band 16 to both fit into the bottom of the groove 10, the band 16 does not reach the bottom of the groove 10, but engages the line 9 cooperatively with the bottom and opposite side walls of the groove. Because the band 16 does not rest on the bottom of the groove 10, positive tension is always exerted on the line 9 by the band. The net result is that the line 9 is urged over away from the slot 6 and extends directly away from the sinker S and along the center line L even though the groove 10 itself is slightly offset therefrom.

One of the advantages of my fish line sinker is that it is so cheap to manufacture and has no movable metal parts which may wear and require the sinker to be discarded at an early date. There are merely two pieces to my sinker, the main body S and the elastic band 16, the latter of which is readily replaceable in the event of breakage. Each of these pieces are inexpensive and effective. My sinker is the utmost in simplicity and can, therefore, be manufactured at a high rate and with a minimum of cost.

It should be noted that my fish line sinker can be readily attached to or detached from a fish line. To remove the sinker from a line, the fisherman merely rolls the band sidewise out of the groove 10 on the side of the sinker S where the groove is most shallow, and the elastic band will immediately snap free and disengage the line 9. To reapply the sinker to a fish line, the line is merely inserted in the slot 6 and the loop of the elastic band 16 is again swung around the ends of the body S and into the position shown in Fig. 3, the direction of swinging of the loop being indicated by the arrow in Fig. 3.

Another advantage of my sinker is that it can be readily adjusted longitudinally of the line 9 without removing the sinker therefrom. By grasping the line firmly with one hand and pulling on the sinker longitudinally of the line, my sinker can be slid along the line 9 to any desired position without detaching the sinker from the line. Nevertheless, the sinker engages the line with sufficient tension so that there is no danger of the line slipping through the sinker as a result of weeds or trolling activities.

It will, of course, be understood that various changes may be made in the form, details, arrangement and proportion of the parts without departing from the scope of my invention which consists of the matter shown and described herein and set forth in the appended claim.

What I claim is:

A fishing sinker having in combination an elongated body heavier than water, said body having a line-receiving slot formed longitudinally thereof in its outer surface and extending inwardly therefrom, said body also having a groove formed in its outer surface extending peripherally of said body and longitudinally of said body in a plane disposed substantially normal to the plane of said slot and slightly offset from the longitudinal center of said body, the plane of said groove being inwardly disposed relative to the bottom of said slot and between the longitudinal center of said body and the bottom of said slot, a fish line extending within said slot and extending longitudinally therethrough, and an elastic band extending within said groove and snugly encircling said body, said band engaging said line and in cooperation with the bottom of said groove securing it against movement relative to said body, said groove having a restricted portion for retaining said band on said sinker body.

References Cited in the file of this patent

UNITED STATES PATENTS

| | | |
|---|---|---|
| 179,490 | Sander | July 4, 1876 |
| 231,417 | Foote | Aug. 24, 1880 |
| 290,154 | Vidal, Jr. | Dec. 11, 1883 |
| 441,447 | Stahl | Nov. 25, 1890 |
| 622,206 | Claflin | Apr. 4, 1899 |
| 1,883,574 | Cleeland | Oct. 18, 1932 |
| 1,992,293 | Craig | Feb. 26, 1935 |
| 2,393,070 | Saloun | Jan. 15, 1946 |
| 2,495,572 | Deutsch | Jan. 24, 1950 |